United States Patent [19]
Kabat

[11] 4,411,306
[45] Oct. 25, 1983

[54] THERMOSTAT WITH IMPROVED TEMPERATURE SENSING CIRCUIT

[75] Inventor: John L. Kabat, Hennepin, Minn.

[73] Assignee: Honeywell Inc., Minneapolis, Minn.

[21] Appl. No.: 268,530

[22] Filed: May 29, 1981

[51] Int. Cl.³ .............................................. F28F 27/00
[52] U.S. Cl. ...................................... 165/12; 165/26; 236/46 R; 323/366
[58] Field of Search ................ 165/12, 26; 236/46 R, 236/47, 1 C; 323/366; 324/DIG. 1

[56] References Cited

U.S. PATENT DOCUMENTS 3,377,545 4/1968 Tveit .................................. 236/1 C
4,341,345 7/1982 Hammer et al. .................. 236/46 R

FOREIGN PATENT DOCUMENTS 2840805 6/1979 Fed. Rep. of Germany .... 236/46 R
886287 1/1962 United Kingdom ......... 324/DIG. 1

Primary Examiner—William R. Cline
Assistant Examiner—John M. Kramer
Attorney, Agent, or Firm—Laurence J. Marhoefer

[57] ABSTRACT

A thermostat with a single control to establish the quantity of set back during heating and set up during cooling.

1 Claim, 2 Drawing Figures

THERMOSTAT WITH IMPROVED TEMPERATURE SENSING CIRCUIT

BACKGROUND OF THE INVENTION

This invention relates to thermostats, and more particularly to an improved temperature sensing bridge circuit for use in thermostats which automatically alter the set point to provide heat set back and cooling set up.

Thermostats for controlling both heating and cooling are well known in the art. Also well known are energy conserving thermostats which automatically change the set point in order to lower the temperature set point at night during the heating season and raise it during the day during the cooling season. Prior art thermostats typically use separate controls for heat set back and cooling set up.

SUMMARY OF THE INVENTION

An object of this invention is to provide a thermostat with a single operator control for establishing the quantity of set point offset; providing a decrease in set point in a heating mode of operation and an increase in set point in a cooling mode.

Briefly this invention contemplates provision of a temperature responsive bridge circuit which has variable set point offset resistor in combination with a logic operated semiconductor switch. The logic operated switch places the set point offset resistor in one arm of the bridge for set back; another arm for set up; and removes variable set point offset resistor during normal operation.

BRIEF DESCRIPTION OF THE DRAWINGS

A better understanding of the present invention may be had when the following detailed description is read in connection with the accompanying drawings, in which.

DESCRIPTION OF THE INVENTION

Figure 1:
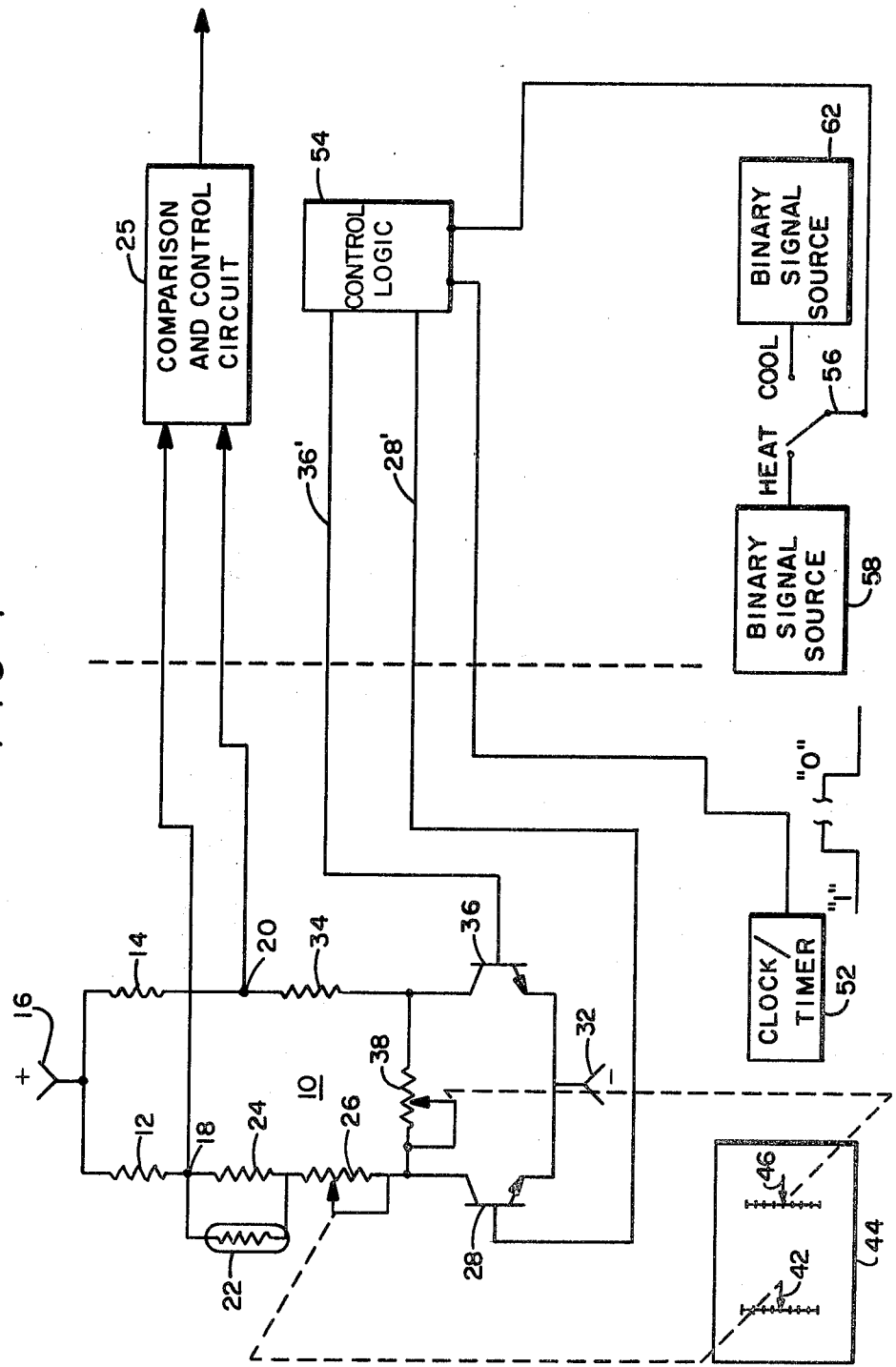
FIG. 1 is a schematic diagram of one illustrative embodiment of this invention.

Referring now to the drawing, an equal arm bridge 10 has a pair of equal resistors 12 and 14 coupled between a positive supply terminal 16 and output terminals 18 and 20. A temperature sensitive resistor 22 is connected across its linearizing resistor 24. As will be apparent to those skilled in the art, as the resistance of resistor 22 changes with the temperature, the bridge moves into or out of balance, producing a control signal between terminals 18 and 20. These terminals may be connected to any suitable comparator and control circuit 25 known in the art. This invention is particularly well suited for use in combination with the circuits described in U.S. Pat. No. 4,248,375.

A set point potentiometer 26 is connected in series with the temperature sensitive resistor 22 and one side of a transistor switch 28, the other side of which is coupled to a negative power supply terminal 32.

The other leg of the bridge has a calibrating resistor 34 connected in series with one side of a transistor switch 36, the other side of which is also connected to the negative power supply 32.

A potentiometer 38 is connected between resistors 26 and 34. This potentiometer provides a variable offset function. To obtain a heat set back, transistor 28 is turned on and transistor 36 is turned off. This places the potentiometer 38 in the same leg of the bridge as the calibrating resistor 34, which, as those skilled in the art will appreciate, has the same effect as reducing the set point.

To obtain cooling set up, transistor 28 is shut off and transistor 36 is turned on. This places the potentiometer 38 in series with the sensor and set point resistor 26 which has the effect of raising the set point. Since the same potentiometer is used for both set up and set back, the amount of temperature change is the same in both modes, but the effect is opposite. The potentiometer 38 thus establishes the quantity change from set point; the direction of change is determined by the mode the system is in; heating or cooling. During the time when no set up or set back is desired, transistors 28 and 32 are both turned on, shorting out potentiometer 38 thus removing it from the bridge.

In operation the set point potentiometer 26 is connected to a set point adjustment control 42 on a panel 44. The adjustment control 42 can be positioned by an operator to establish a desired temperature. The variable set-point offset potentiometer 38 is connected to a control 46 on the panel 44. Positioning this adjustment allows an operator to select a desired "quantity" of offset (five degress for example) without regard for whether it is set up or set back. The system will automatically provide set back during the heating cycle, and set up during the cooling cycle.

An adjustable timer 52, of a suitable type known in the art, puts out a signal of one binary significance during one or more intervals of a predetermined cycle (a 24 hour cycle, for example), and a signal of another binary significance during the other intervals. For example, a signal representative of binary "0" during so called normal hours when no set back or set up is desired, and a signal of binary significance "1" when set back is desired. It will be understood that the clock/timer 52 may be physically part of the panel 44 and that both the duration of the intervals and their place in the cycle may be adjusted. The output of clock timer 52 is connected as one input to a logic array 54 whose other input is connected to a heat/cool select switch 56. If switch 56 is in the heating position a source 58 of one binary significance is connected to the array 54, and if in the cooling position a source 62 of opposite significance is so connected.

Leads 28' and 36' respectively couple the array to the bases at transistors 28 and 36. In the following example, it is assumed a binary "1" connected to the base of a transistor turns it on, and a binary "0" turns it off. Array or logic control 54 which may be any suitable combination of logic elements which are known in the art, executes by way of example, the following truth table:

| Input to 54 | | | Output from 54 | | |
|---|---|---|---|---|---|
| CK | Heat | Cool | Lead 36' | Lead 28' | |
| 1 | 1 | — | 1 | 1 | Normal* |
| 1 | 0 | 0 | 1 | 1 | Normal* |
| 0 | 1 | — | 0 | 1 | Set back |
| 0 | — | 0 | 1 | 0 | Set up |

*(No set point offset)

Figure 2:
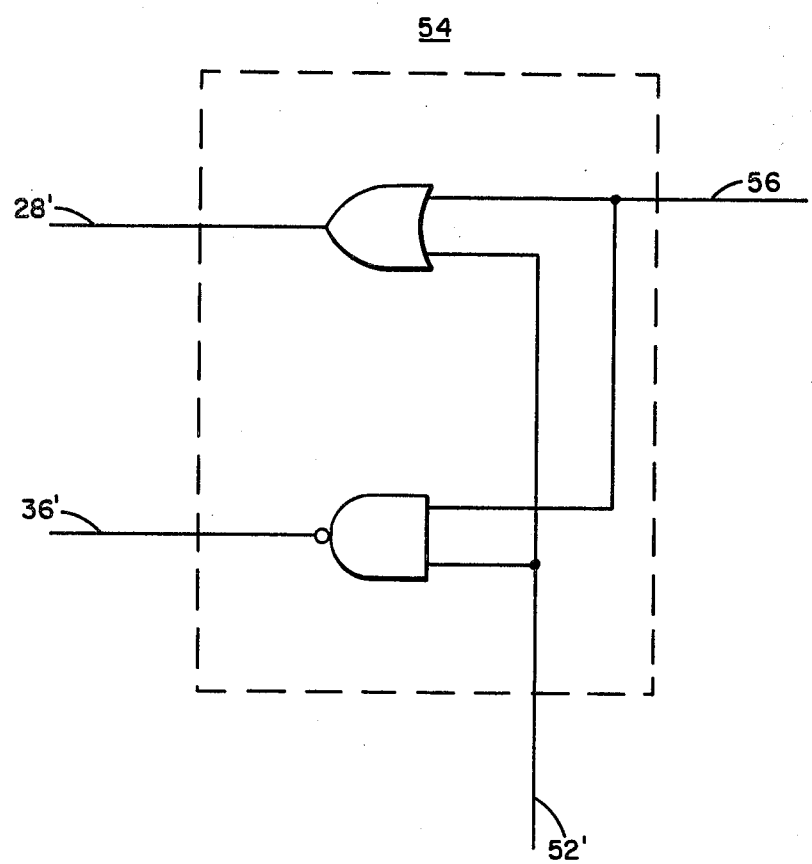
FIG. 2 is a schematic drawing of one embodiment of a logic circuit for use in the embodiment of FIG. 1.

The outputs of array 54 are connected respectively to the bases of transistor 28 and 36. In this example, it is assumed that a binary "1" connected to the base of a transistor renders it conductive, and a binary "0" turns it off. FIG. 2 is an illustrative example of the control logic array 54.

Thus, in an illustrative example, during the heating season the set back period may be from 10:00 PM to 6:00 AM. During this set back period the clock/timer 52 couples a signal of binary "0" significance to the logic control 54; during the remainder of the cycle (e.g., 24 hours) the clock/timer output is binary "1". The heat/cool selector 56 is set to the heat position, providing a binary "1" input to the logic control. The amount of offset is selected by means of control 46. The variable offset 38 resistor will be shorted out until 10:00 PM. From 10:00 PM to 6:00 AM it will be connected in series with the calibration resistor 34 effectively lowering the set point. After 6:00 AM it will be again switched out of the circuit unit 10:00 PM.

Similarly, in the cooling season the set up period may be from 9:00 AM to 5:00 PM. During this period the clock/timer 52 again couples a signal of binary "0" to controller 54. During the remainder of the cycle its output is binary "1". With the heat/cool selector 56 set to cool, there is a binary "0" input to the logic control. Thus, the variable set back resistor is switched out from the circuit except during the period of 9:00 AM to 5:00 PM. During this period it is connected in series with the temperature sensing resistor effectively raising the set point.

Thus, it will be apparent the objective of the invention has been accomplished, in that a single control can be used to establish the quantity of set back during heating and set up during cooling.

What is claimed is:

1. A thermostat with an improved temperature response circuit comprising in combination:
    a temperature responsive circuit, said circuit having two power supply terminals with a temperature sensitive impedance in one circuit branch between said terminals and a calibration impedance in another circuit branch between said terminals;
    a variable, set point, offset impedance;
    a set point, offset control coupled to said offset impedance;
    a control logic circuit;
    means for selecting heating and cooling operating modes;
    first means coupled to said logic circuit for producing an output signal of one binary significance when said heating mode is selected;
    second means coupled to said logic circuit for producing an output signal of the other binary significance when a cooling mode is selected;
    a timing circuit coupled to said logic circuit and producing a cyclical output signal of one binary significance for part of a cycle and the other binary significance for part of said cycle;
    said logic circuit producing, respectively, a first control output, a second control output, or a third control output in response to the binary state of the output of said timing means, and the output of said first means and said second means; and
    means responsive to said logic circuit outputs to connect said variable set point offset impedance in series with said temperature sensitive impedance in response to said first output, or in series with said calibration impedance in response to said second output.

* * * * *